May 15, 1934.  E. L. ROBINSON  1,959,220
ROTARY DISK, TURBINE BUCKET WHEEL, OR THE LIKE
Filed May 26, 1933
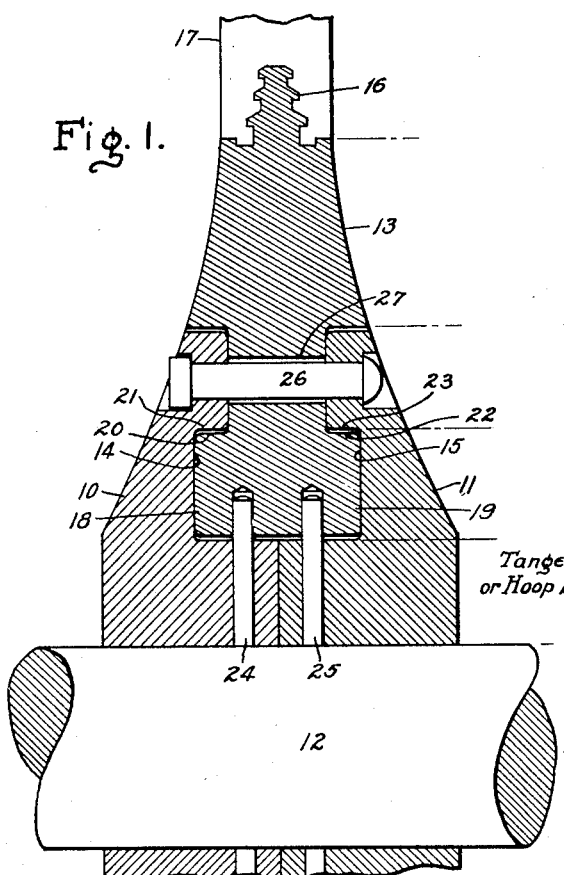
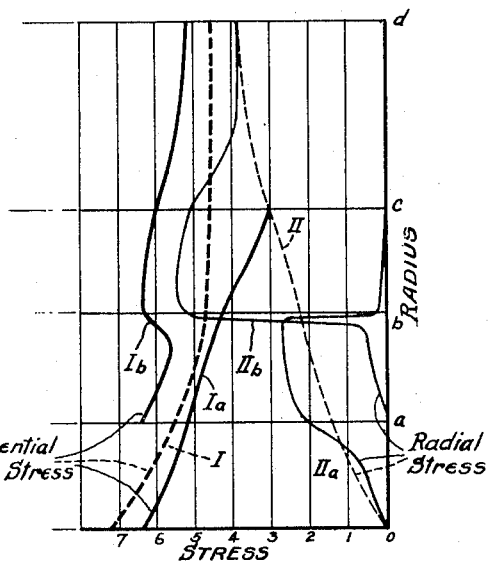
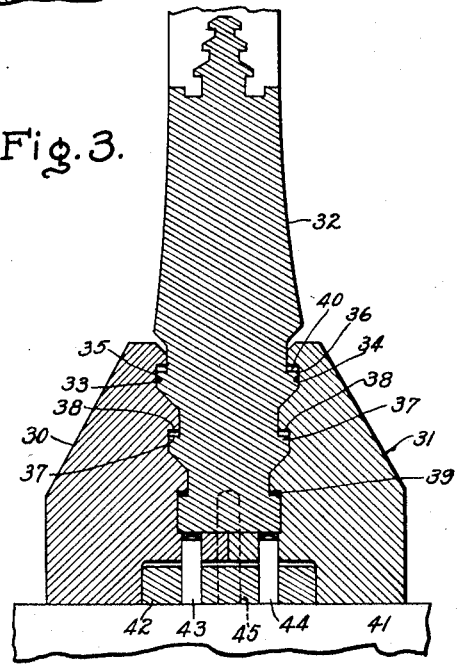
Inventor
Ernest L. Robinson
by Harry E. Dunham
His Attorney.

Patented May 15, 1934

1,959,220

UNITED STATES PATENT OFFICE 1,959,220

ROTARY DISK TURBINE BUCKET WHEEL, OR THE LIKE

Ernest L. Robinson, Schenectady, N. Y., assignor to General Electric Company, a corporation of New York Application May 26, 1933, Serial No. 673,076

7 Claims. (Cl. 253—39)

The present invention relates to rotary disks, such as turbine bucket wheels and like bodies, rotated about their axes at high speed. Bodies of this kind when in operation, that is, when rotated about their axes, are subject to centrifugal forces causing stresses in the material thereof. These stresses are not uniform throughout the body but usually, especially with regard to bucket wheels used in elastic fluid turbines, are greater in the central parts or portions than in the outer parts or portions of the body.

One object of the invention is to provide an improved construction and arrangement for disks and like bodies rotated about their axes whereby a more uniform distribution of stresses set up in the bodies during operation is obtained. Another object of the invention is to provide an improved design for a disk whereby disks of large sizes can be satisfactorily heat-treated.

For a consideration of what I consider to be novel and my invention, attention is directed to the following description and the claims appended thereto in connection with the accompanying drawing.

In the drawing, Fig. 1 represents a disk embodying my invention; Fig. 2 is an explanatory diagram; and Fig. 3 represents another disk embodying a modification of my invention.

In Fig. 1, I have shown by way of example a bucket wheel such as is used in elastic fluid turbines for transforming the available energy of an elastic fluid into mechanical energy and transmitting it to a rotary shaft. The wheel or disk comprises two inner disk members 10 and 11 secured to a shaft 12, in the present instance by a shrinking fit therewith, and an outer disk member 13 having an outer portion extending radially beyond the inner disk members 10 and 11. The inner disk members 10 and 11 have concentric grooves or recesses 14 and 15 respectively cut into their adjacent faces. An outer portion of the outer disk member is provided with a recessed rim 16 for supporting a plurality of bucket blades 17. An inner portion of the outer disk member 13 is provided with annular projections 18 and 19 located in the corresponding recesses 14 and 15.

The annular projection 18 has an outer shoulder 20 facing away from the shaft or axis and concentrically arranged with an inner shoulder 21 defined by the recess 14 in the inner disk member 10. The projection 19 similarly has an outer shoulder 22 concentrically arranged with an inner shoulder 23 defined by the recess 15 in the inner disk member 11. In accordance with my invention the inner and outer disk members are dimensioned so that the shoulders 20 and 21 and the shoulders 22 and 23 define clearances while the body or disk is at rest and at low speed. The clearances between said inner and outer shoulders form an important feature of my invention. Thus a body to be rotated about its axis comprises in accordance with my invention an inner member 10 having a recessed face 14 defining an inner shoulder 21 facing the axis and an outer member 13 having a portion projecting radially beyond the inner member and another portion 18 adjacent the recessed face of the inner member and defining an outer shoulder 20 concentrically spaced from the inner shoulder.

A plurality of pins 24 and 25 are provided in radial holes extending through portions of the inner disk members and a portion of the outer disk member. The pins have a sliding fit in the holes of at least one of these members. For example, they may be fastened in the holes of members 10 and 11 and have a sliding fit in the holes in the member 13. Preferably I provide at least three pins 24 uniformly spaced along the circumference of the member 10. The pins maintain concentric relation between the inner and outer disk members and transmit torque between said members. With respect to a turbine wheel, torque is transmitted from the outer member 13 through the pins 24 and 25 to the inner mtmbers 10 and 11 and the shaft 12 fastened to the latter. The pins 24 and 25 therefore represent means for maintaining concentric relation between the inner and outer members of the disk and for transmitting torque therebetween. In the example shown in Fig. 1, I have indicated a further element for uniting the disk in the form of a bolt or rivet 26 extending axially through holes in the inner disk members 10 and 11 and a hole 27 in the outer disk member 13. The hole 27 in the outer disk member 13 is dimensioned in accordance with my invention to define a clearance with the bolt 26 of a magnitude of the clearance defined between the shoulders 20 and 21.

With the design of a disk according to my invention a better distribution of stresses set up in the disk during rotation is obtained than was possible in structures of this kind designed heretofore. To convey a better appreciation of this fact I have shown in the explanatory diagram of Fig. 2 the stress curves obtained with a disk in accordance with my invention and by way of comparison with a solid disk of the same contour and subject to the same condition.

The dotted curves I and II represent the tangential and the radial stresses respectively for a solid disk of the contour of that shown in Fig. 1, that is, for a disk in which the parts 10, 11, and 13 are integrally united. The stresses have been designated in the diagram by 0 to 7 and the radii have been designated by $a$, $b$, $c$, and $d$. The curve I shows that the maximum tangential or hoop stress in a solid disk takes place at the inner circumference and its magnitude is equal to about 7.2. This stress decreases with increasing radius and reaches a minimum value of 4.6 at the outer circumference (radius $d$). The radial stress set up in a solid disk due to centrifugal force is zero at the inner circumference of the disk and increases with increasing radius, reaching a maximum of 3.8 at the outer circumference of the disk. The conclusions which we may readily draw from a consideration of the stress curves of a single piece or solid disk are that the inner portions of such a disk are highly stressed during operation whereas the outer portions thereof are less highly stressed, that is, from another viewpoint, the outer portions fail to participate in resisting the bursting forces set up in the disk during operation. It must be borne in mind that these stress curves are obtained for a disk which has curved side walls of the contour shown in Fig. 1, that is, in which the inner portions are considerably reinforced. A further increase of the actual dimensions of the inner portions of such a disk for obtaining a better stress distribution might make such disk portions too big to permit satisfactory heat treatment.

Curves Ia and Ib represent the tangential or hoop stress for the actual design of the disk shown in Fig. 1 subject to the same condition for which curve I for the solid disk has been obtained. More specifically, the curve Ia represents the hoop stress set up in the inner disk members 10 and 11 and curve Ib represents the hoop stress set up in the outer disk member 13. The result is important in that it clearly shows that the stresses set up in the central portions of members 10 and 11 are lower than in the corresponding portion of the solid disk. The maximum stress obtained near the inner circumference, that is, near the wall of the disk, has a magnitude of about 6.4 as compared with the magnitude 7.2 of the corresponding portion of the solid disk. The stresses set up in the outer disk member 13 represented by curve Ib are higher than they were for the solid disk. The stress in the outer circumference, that is, at the radius $d$, has a magnitude of 5.2 as compared with the magnitude 4.6 for the solid disk.

The radial stresses set up in the members 10 and 11 of the improved disk are represented by the curve IIa and the radial stresses set up in the outer disk member 13 are represented by the curve IIb. The curves show that in a disk according to my invention the stress reaches a maximum value at several points but all these maxima are lower than the maximum stress set up in a solid disk. The more uniform distribution of stresses is obtained by the provision of a clearance between the inner and outer disk members. The clearance or clearances permit the outer member to expand outwardly and accept some stress before the outer shoulders of the outer member engage the inner shoulders of the inner members. The engagement of said shoulders takes place at predetermined speed when the stresses in the outer member have reached a certain value due to the expansion of the wheel caused by the centrifugal forces therein. From another viewpoint, the stresses set up in the outer member of the disk are not transferred at low speed to the central portion, that is, the inner members or hub portions of the disk do not participate in resisting the bursting load from without until a predetermined speed has been reached. As soon as such predetermined speed has been attained, the outer shoulders of the outer disk member engage the inner shoulder of the inner disk member or members, to the effect that thereafter stresses set up in the outer member are partly transferred to the inner member or members. During normal operation, that is, at hight speed, the inner portions or members of the disk are strained less than they would be in a solid disk. The entire structure works more efficiently than is possible with a single piece or a solid structure.

Another important feature of my disk structure is that it can be manufactured in any desirable size, being composed of a plurality of members and thereby overcoming certain difficulties in the forging and heat-treating of large size solid structures. My structure accordingly enables the carrying of rim loads of a magnitude not otherwise possible because of the limited size to which individual forgings can be built satisfactorily.

The disk illustrated in Fig. 3 comprises two inner disk members 30 and 31 corresponding to members 10 and 11 of Fig. 1 and an outer disk member 32 corresponding to the outer disk member 13 of Fig. 1. A plurality of concentric annular grooves 33 and 34 are cut into the adjacent faces of disks 30 and 31 respectively. By "concentric grooves" I mean grooves having a center coinciding with the axis of the disk. The grooves in each face are arranged at different radii. Concentric annular projections 35 and 36 formed on an inner portion of the outer disk member 32 project into the grooves 33 and 34 respectively. The projections 35 and 36 have outer shoulders 37 facing away from the axis of the disk and concentrically spaced from inner shoulders 38 facing towards the axis and defined by the grooves in the inner disk members. In the present instance I have shown an arrangement in which the clearances defined by the inner and outer shoulders of said members differ for different radii. The clearance 39, as can be clearly seen from the drawing, is smaller than the clearance 40. The disk is secured to a rotary shaft 41 by means including a ring 42 shrunk onto the shaft and located in a recess defined by the inner disk members 30 and 31. The inner disk members have a sliding fit with the shaft. The transmission of torque from the inner disk member to the shaft and concentric relation of the inner disk members with the shaft are accomplished by the provision of a plurality of pins 43 and 44 located in radial holes of the shrink ring 42 and the inner disk members 30 and 31. The radial pins 43 and 44 have a sliding fit in at least one of said members, that is, they either slide in the holes in the shrink ring 42 or in the holes of the inner disk members 30 and 31. Concentric relation between the outer disk member and the inner disk members and transmission of torque between said members is accomplished by a plurality of other pins 45 projecting through holes in the inner and outer disk members.

During operation the outer disk member 32 is subject to stresses at low speed and forced to accept a stressed condition without being permitted to transmit such stresses to the inner disk members 30 and 31 owing to the provision of the clearances 39, 40, etc. As the speed of the disk on wheel increases, the centrifugal forces and stresses increase accordingly and cause expansion of the outer disk member whereby the clearances formed between the inner and outer members decrease with increasing speed until finally the shoulders of the outer member engage the shoulders of the inner members, thus substantially increasing the stresses in the inner members at all higher speeds. These stresses produced in the central portions of the inner members, however, do not reach the magnitude attained where the disk of a single solid piece. On the other hand, the stresses obtained in the outer member of the disk will be higher at normal speed than where obtained in an integrally formed disk, resulting in a more uniform distribution of stresses in the disk and a lowering of the maximum stress in the central disk portion.

For assembling the disk on the shaft, the shrink ring 42 is assembled with the inner and outer disk members by the insertion of the pins. These parts are then heated and slid onto the shaft, the subsequent cooling of the shrink ring 42 causing a shrinking fit with the shaft.

Having described the method of operation of my invention, together with the apparatus which I now consider to represent the best embodiments thereof, I desire to have it understood that the apparatus shown is only illustrative and that the invention may be carried out by other means.

What I claim as new and desire to secure by Letters Patent of the United States, is:

1. A body to be subjected to high stresses due to rotation about its axis comprising an inner member having a recessed face defining an inner shoulder facing the axis, an outer member having a portion projecting radially beyond the inner member and another portion adjacent the recessed face of the inner member and defining an outer shoulder concentrically spaced from the inner shoulder for engaging the latter at a predetermined speed to equalize the distribution of stresses in the body, and means for transferring torque between the inner and outer members.

2. A rotatable disk to be subjected to high stresses due to rotation about its axis comprising an inner and an outer disk member, the inner disk member having a face recessed concentrically about its axis, the outer disk member having a portion projecting radially beyond the inner portion and a projection located within the recessed face of the inner portion and concentrically spaced therefrom for engaging a shoulder defined by the recessed face at a predetermined speed to equalize the distribution of stresses, and means for maintaining concentric relation between the disk members and transferring torque between them.

3. A disk to be subjected to high stresses due to rotation about its axis comprising an inner disk member having a recess in its face in concentric relation to the axis of the disk, an outer disk member having a portion projecting radially beyond the inner disk member and an annular projection located within said recess, said annular projection having an outer shoulder concentrically spaced from an inner shoulder defined by the recess for engaging the inner shoulder at a predetermined speed to equalize the distribution of stresses in the disk, and a plurality of pins projecting through radial holes in the inner and outer disk members and having a sliding fit in the holes of at least one of said members for maintaining concentric relation and transferring torque between the members.

4. A disk comprising two inner disk members having recesses in their adjacent faces, an outer disk member having an outer portion projecting radially beyond the inner member and an inner portion provided with projections located in the recesses, said projections defining outer shoulders concentrically spaced from corresponding inner shoulders defined by the recesses for engaging said inner shoulders at a predetermined speed to equalize the distribution of stresses in the disk, and means for transferring torque between the inner and outer members.

5. In combination with a rotary shaft, a disk having two inner disk members fastened to the shaft, said members having concentric recesses in their adjacent faces, an outer disk member having an outer portion projecting radially beyond the inner members and an inner portion provided with annular projections located in the corresponding recesses and having outer shoulders spaced from inner shoulders defined by the recesses for engaging said inner shoulders at a predetermined speed to equalize the stress distribution in the disk, and axial bolts fastened to the inner members and projecting through holes in the outer member, the holes and the bolts defining an annular clearance.

6. In combination with a rotary shaft, a disk comprising two inner disk members secured to the shaft and having a plurality of concentric recesses in each of their adjacent faces, an outer disk member having an outer portion projecting radially beyond the inner member and an inner portion provided with a plurality of annular concentric projections located in the corresponding recesses of the inner members, each projection having an outer shoulder concentrically spaced from an inner shoulder defined by the recess in which it is located for engaging said inner shoulder at a predetermined speed to equalize the distribution of stresses in the disk.

7. In combination with a rotary shaft, a disk comprising two inner disk members having a plurality of concentric recesses in each of their adjacent faces, an outer disk member having an outer portion projecting radially beyond the inner member and an inner portion provided with a plurality of annular concentric projections located in the corresponding recesses of the inner members, each projection having an outer shoulder concentrically spaced from an inner shoulder defined by the recess in which it is located for engaging said inner shoulder at a predetermined speed to equalize the distribution of stresses in the disk, means for maintaining concentric relation between the outer and inner disk members comprising a plurality of pins slidably projecting through radial holes in said members, and means for securing the disk to the shaft comprising a ring shrunk onto the shaft and pins provided in radial holes of the ring and the inner disk members.

ERNEST L. ROBINSON.